(12) United States Patent
Huelke

(10) Patent No.: US 7,815,252 B2
(45) Date of Patent: Oct. 19, 2010

(54) ANTI-ROTATION CLIP FOR MOON ROOF DRAIN TUBE

(75) Inventor: David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 12/328,399

(22) Filed: Dec. 4, 2008

(65) Prior Publication Data

US 2010/0140983 A1    Jun. 10, 2010

(51) Int. Cl.
*B60J 7/00* (2006.01)
(52) U.S. Cl. .................................... 296/213; 280/730.2
(58) Field of Classification Search ................ 296/213, 296/216.06–216.08; 248/68.1, 69.1, 222.12, 248/226.11; 24/336, 339, 555, 545; 280/730.2
See application file for complete search history.

(56) References Cited

U.S. PATENT DOCUMENTS

| | | | |
|---|---|---|---|
| 3,078,122 A | 2/1963 | Werner | |
| 4,289,349 A | 9/1981 | Symeonidis | |
| 4,355,843 A | 10/1982 | Murakami | |
| 4,368,915 A | 1/1983 | Torii | |
| 4,494,790 A | 1/1985 | Omura | |
| 4,508,382 A | 4/1985 | Tsumoto et al. | |
| 4,589,694 A | 5/1986 | Kempter | |
| 4,728,145 A | 3/1988 | Benedetto | |
| 4,844,532 A | 7/1989 | Ono et al. | |
| 4,881,705 A * | 11/1989 | Kraus | ........................ 248/74.2 |
| 4,892,351 A | 1/1990 | Ono et al. | |
| 4,971,386 A | 11/1990 | Bohm et al. | |
| 5,009,464 A | 4/1991 | Hasegawa et al. | |
| 5,149,170 A | 9/1992 | Matsubara et al. | |
| 5,209,546 A | 5/1993 | Hasegawa et al. | |
| 5,332,282 A | 7/1994 | Maeda et al. | |
| 5,810,429 A | 9/1998 | Jardin et al. | |
| 5,902,008 A | 5/1999 | Butsuen et al. | |
| 5,961,177 A | 10/1999 | Caye et al. | |
| 6,065,801 A | 5/2000 | Kawamura et al. | |
| 6,189,961 B1 | 2/2001 | Poliskie et al. | |
| 6,224,091 B1 | 5/2001 | Eyrainer et al. | |
| 6,267,407 B1 | 7/2001 | Zychowicz et al. | |
| 6,334,646 B1 | 1/2002 | Oami | |
| 6,367,872 B1 | 4/2002 | Böhm et al. | |
| 6,485,049 B1 | 11/2002 | Prottengeier et al. | |
| 6,786,537 B2 | 9/2004 | Allan et al. | |
| 7,100,974 B2 | 9/2006 | Schönebeck | |
| 7,374,234 B2 | 5/2008 | Deschatres et al. | |
| 7,404,597 B2 | 7/2008 | Romig | |

(Continued)

*Primary Examiner*—Dennis H Pedder
(74) *Attorney, Agent, or Firm*—Gregory Brown; Price, Heneveld, Cooper, DeWitt & Litton, LLP

(57) ABSTRACT

A vehicle comprising a vehicle frame having a moon roof channel, a structural panel and a pillar. The vehicle also includes a side curtain air bag canister holding a side curtain air bag, a bracket engaged with the canister and connecting the side curtain air bag canister to the vehicle frame, a drain tube being connected to the moon roof channel, with the drain tube being configured to route drain fluid from the moon roof channel down the pillar, and a clip for connecting the drain tube to the side curtain air bag canister. The clip has a first section for engaging the canister and a second section for engaging the drain tube, with the clip having a wing abutting the bracket for preventing the clip from rotating on the canister.

21 Claims, 3 Drawing Sheets

U.S. PATENT DOCUMENTS

2005/0046154 A1* 3/2005 Rhea et al. ............... 280/728.2
2007/0063490 A1* 3/2007 Minamikawa ........... 280/728.2
2008/0061603 A1 3/2008 Romig
2008/0217964 A1 9/2008 Katayama et al.

* cited by examiner

ANTI-ROTATION CLIP FOR MOON ROOF DRAIN TUBE

FIELD OF THE INVENTION

The present invention concerns vehicles, and more particularly relates to an anti-rotation clip for a moon roof drain tube.

BACKGROUND OF THE INVENTION

Heretofore, moon roofs of vehicles have had a plurality of drain tubes for draining water surrounding the moon roof. The drain tubes have extended down the A-pillar and/or the B, C or D-pillar of the vehicle frame. The drain tubes have been connected to side curtain air bag canisters via a clip to position the drain tubes within the vehicle. However, the clips and the drain tubes sometime move and/or become loose, thereby causing rattling and undesired noise in the vehicle.

SUMMARY OF THE PRESENT INVENTION

An aspect of the present invention is to provide a vehicle assembly comprising a side curtain air bag canister holding a side curtain air bag and at least one bracket engaged with the side curtain air bag canister, with the at least one bracket being configured to connect the side curtain air bag canister to a frame of the vehicle. The vehicle assembly further includes a drain tube being configured to have drain fluid from a moon roof of the vehicle drain therethrough and a clip for connecting the drain tube to the side curtain air bag canister. The clip has a first section for engaging the side curtain air bag canister and a second section for engaging the drain tube, with the clip having at least one wing abutting the at least one bracket for preventing the clip from rotating on the side curtain air bag canister.

Another aspect of the present invention is to provide a vehicle comprising a vehicle frame having a moon roof channel, a structural panel and a pillar. The vehicle also includes a side curtain air bag canister holding a side curtain air bag and at least one bracket engaged with the side curtain air bag canister, with the at least one bracket connecting the side curtain air bag canister to the structural panel of the vehicle frame of the vehicle. The vehicle also includes a drain tube connected to the moon roof channel, with the drain tube being configured to route drain fluid from the moon roof channel down the pillar, and a clip for connecting the drain tube to the side curtain air bag canister. The clip has a first section for engaging the side curtain air bag canister and a second section for engaging the drain tube, with the clip having at least one wing abutting the at least one bracket for preventing the clip from rotating on the side curtain air bag canister.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
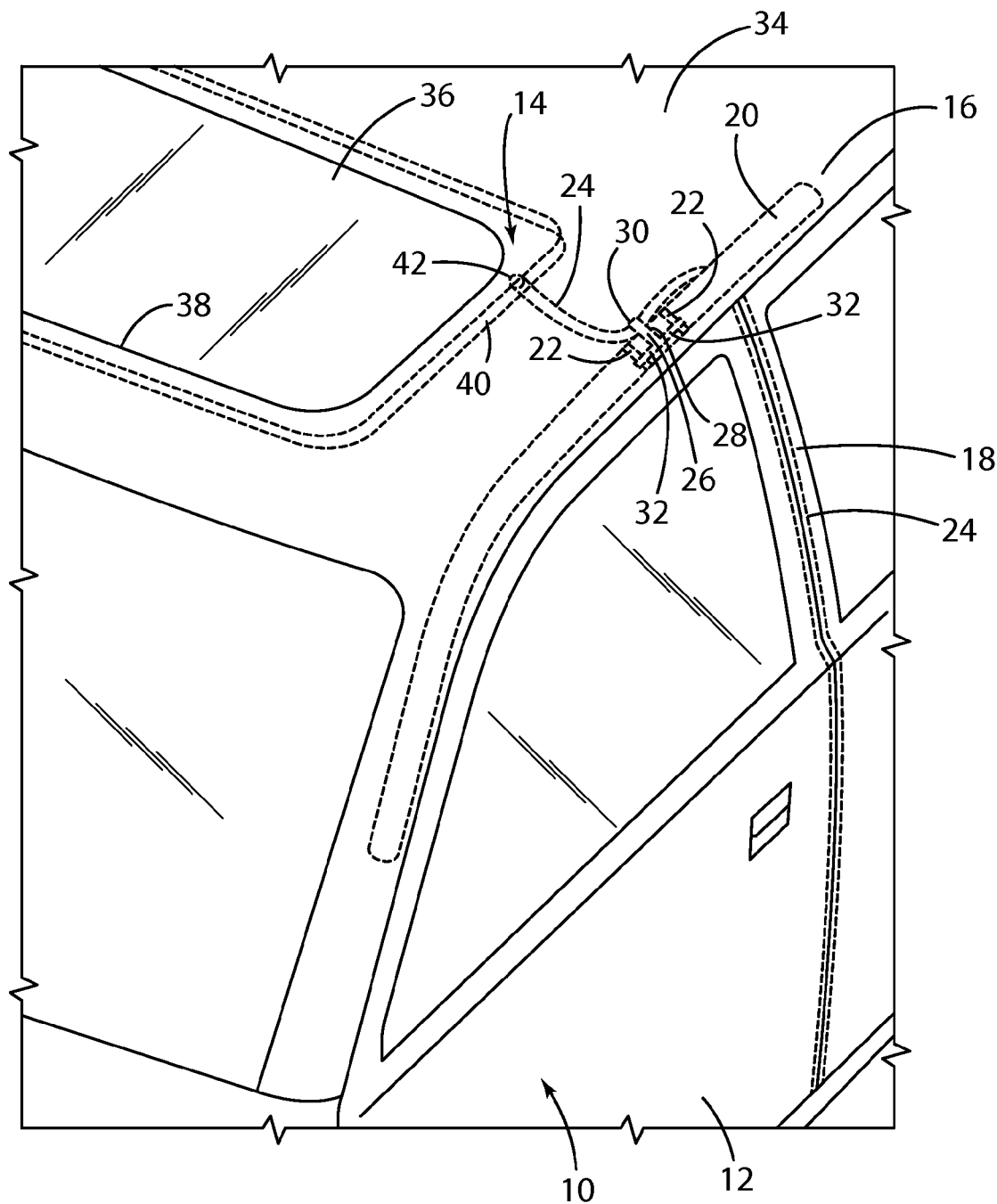
FIG. 1 is a partial perspective view of a vehicle embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates vehicle comprising a vehicle frame 12 having a moon roof channel 14, a structural panel 16 and a pillar 18. The vehicle 10 also includes a side curtain air bag canister 20 holding a side curtain air bag and at least one bracket 22 engaged with the side curtain air bag canister 20, with the at least one bracket 22 connecting the side curtain air bag canister 20 to the structural panel 16 of the vehicle frame 12 of the vehicle 10. The vehicle 10 also includes a drain tube 24 connected to the moon roof channel 14, with the drain tube 24 being configured to route drain fluid from the moon roof channel 14 down the pillar 18, and a clip 26 for connecting the drain tube 24 to the side curtain air bag canister 20. The clip 26 has a first section 28 for engaging the side curtain air bag canister 20 and a second section 30 for engaging the drain tube 24, with the clip 26 having at least one wing 32 abutting the at least one bracket 22 for preventing the clip 26 from rotating on the side curtain air bag canister 20.

In the illustrated example, the vehicle 10 includes the vehicle frame 12 having the moon roof channel 14 in a roof 34. The moon roof channel 14 is configured to have a moon roof 36 therein as is well known to those skilled in the art. As used herein, moon roof and moon roof channel are the same as a sun roof and a sun roof channel. The moon roof channel 14 has a central opening 38 allowing an interior of the vehicle 10 to be open to the atmosphere. The moon roof channel 14 also includes a conduit 40 surrounding the central opening 38. The conduit 40 is configured to accept water thereon associated with having an opening in the roof 34 as is known to those skilled in the art and to direct the water to a drain opening 42 in the moon roof channel 14. In the illustrated example, the moon roof channel 14 has one drain opening 42. However, it is contemplated that the moon roof channel 14 could have any number of drain openings 42. The drain tube 24 is connected to the moon roof channel 14 at the drain opening 42 and is configured to route the water from the moon roof channel 14 to a bottom portion of the vehicle 10 for draining the water unto a road surface and not into the vehicle. In the illustrated example, the pillar 18 is the "B-pillar" of the vehicle (i.e., the pillar between the front and rear doors) and the drain tube 24 routes the water from the moon roof channel 14 and down the B-pillar. However, it is contemplated that the drain tube 24 could route water down any pillar 18 (e.g., A-pillar or B-pillar) of any vehicle (e.g., car, van, pick-up truck, etc.). The drain tube 24 can be any flexible tube for allowing a fluid to flow therethrough.

The illustrated side curtain air bag canister 20 is connected to the structural panel 16 of the vehicle 10. The side curtain air bag canister 20 holds a side curtain air bag configured to be deployed to protect a person in the vehicle 10 as is well known to those skilled in the art. The side curtain air bag canister 20 is substantially cylindrical. In the illustrated example, the brackets 22 connect the side curtain air bag canister 20 to the structural panel 16 of the vehicle 10. The brackets 22 surround the side curtain air bag canister 20. Although two brackets 22 are shown, it is contemplated that any number of brackets 22 could be employed to connect the side curtain air bag canister 20 to the structural panel 16 of the vehicle 10 (including only one bracket 22). The clip 26 connects the drain tube 24 to the side curtain air bag canister 20 for maintaining the drain tube 24 in position within the vehicle 10.

Figure 2:
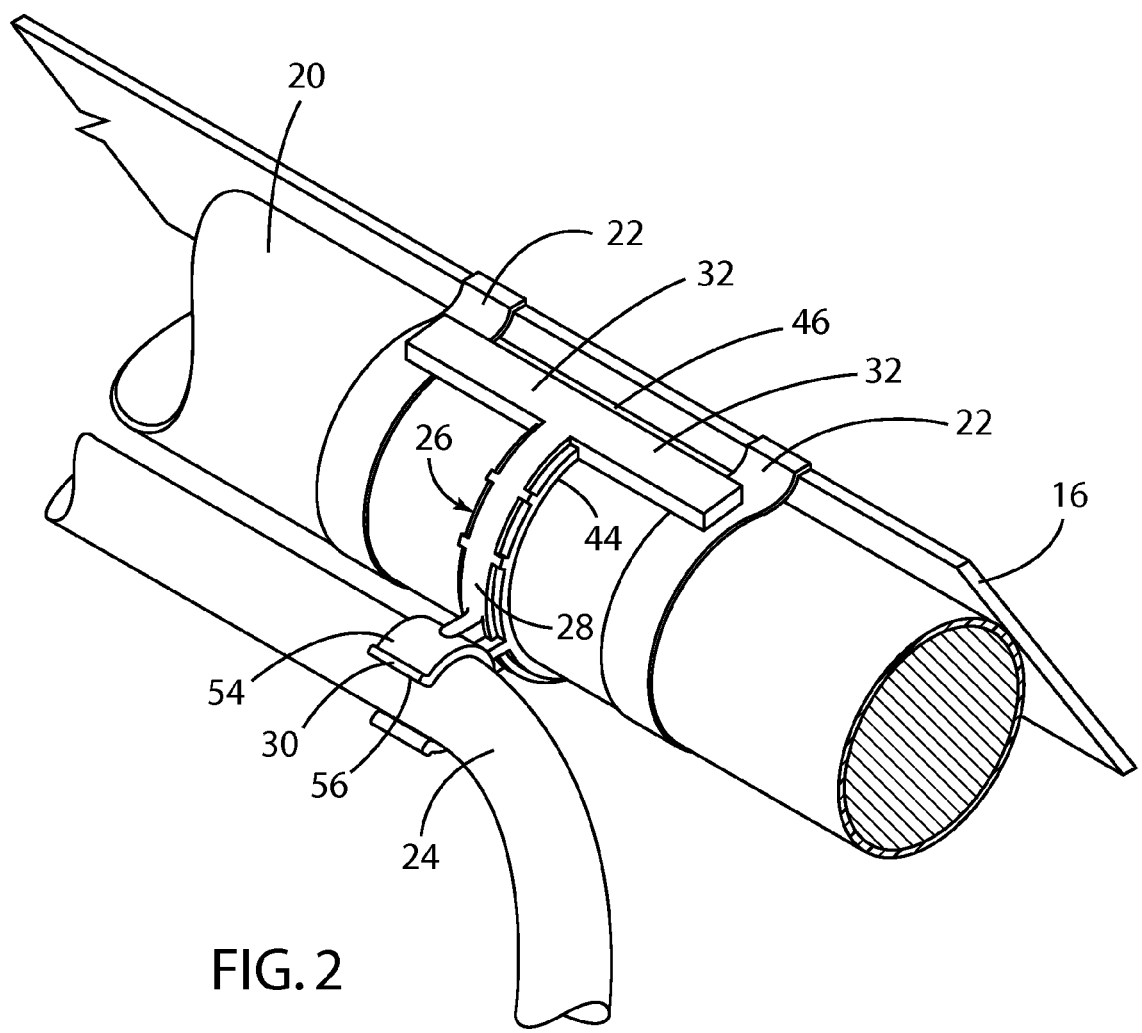
FIG. 2 is a partial perspective view of a portion of a frame of the vehicle, a side curtain air bag canister and a clip for holding a drain tube embodying the present invention.

In the illustrated example, the clip 26 includes the first section 28 for engaging the side curtain air bag canister 20 and the second section 30 for engaging the drain tube 24. The clip 26 can be made of any flexible, yet resilient material (e.g., plastic) and can be formed in any manner (e.g., molding). The first section 28 of the clip 26 comprises a semi-circular canister grasping portion 44 having a first open slot 46. The semi-circular canister grasping portion 44 defines more than 180° of a circle and defines a canister accepting area 48 within the semi-circular canister grasping portion 44. As illustrated in FIG. 2, the side curtain air bag canister 20 is inserting into the canister accepting area 48 of the semi-circular canister grasping portion 44 of the first section 28 of the clip 26 by flexing the semi-circular canister grasping portion 44 on opposite sides of the first open slot 46 outward and inserting the side curtain air bag canister 20 through the first open slot 46 and into the canister accepting area 48. The semi-circular canister grasping portion 44 on opposite sides of the first open slot 46 are then released to flex back to their original configuration, thereby grasping the side curtain air bag canister 20 within the semi-circular canister grasping portion 44. It is contemplated that an interior surface 50 of the semi-circular canister grasping portion 44 could have projections thereon for assisting in grasping the side curtain air bag canister 20. Furthermore, it is contemplated that an exterior surface 52 of the semi-circular canister grasping portion 44 could have thickened portions 55 for providing strength to the first section 28.

The illustrated second section 30 of the clip 26 comprises a semi-circular drain tube grasping portion 54 having a second open slot 56. The semi-circular drain tube grasping portion 54 defines more than 180° of a circle and defines a drain tube accepting area 58 within the semi-circular drain tube grasping portion 54. As illustrated in FIG. 2, the drain tube 24 is inserting into the drain tube accepting area 58 of the semi-circular drain tube grasping portion 54 of the second section 30 of the clip 26 by flexing the semi-circular drain tube grasping portion 54 on opposite sides of the second open slot 56 outward and inserting the drain tube 24 through the second open slot 56 and into the drain tube accepting area 58. The semi-circular drain tube grasping portion 54 on opposite sides of the second open slot 56 are then released to flex back to their original configuration, thereby grasping the drain tube 24 within the semi-circular drain tube grasping portion 54. It is contemplated that an interior surface 60 of the semi-circular drain tube grasping portion 54 could have projections thereon for assisting in grasping the drain tube 24. Furthermore, it is contemplated that an exterior surface 62 of the semi-circular drain tube grasping portion 54 could have thickened portions for providing strength to the second section 30. It is further contemplated that the semi-circular drain tube grasping portion 54 on opposite sides of the second open slot 56 could have flared outward ends 66 for allowing the drain tube 24 to be easily inserted into the drain tube accepting area 58 within the semi-circular drain tube grasping portion 54.

In the illustrated example, the clip 26 includes a spanning section 68 connecting the first section 28 of the clip 26 to the second section 30 of the clip 26. However, it is contemplated that the first section 28 of the clip 26 could be directly connected to the second section 30 of the clip 26. The spanning section 68 comprises a plate 70 of material extending between the first section 28 of the clip 26 and the second section 30 of the clip 26. The spanning section 68 could also include a strut 72 connected to each side of the plate 70, the first section 28 of the clip 26 and the second section 30 of the clip 26 for providing strength and support to the clip 26.

Figure 3:
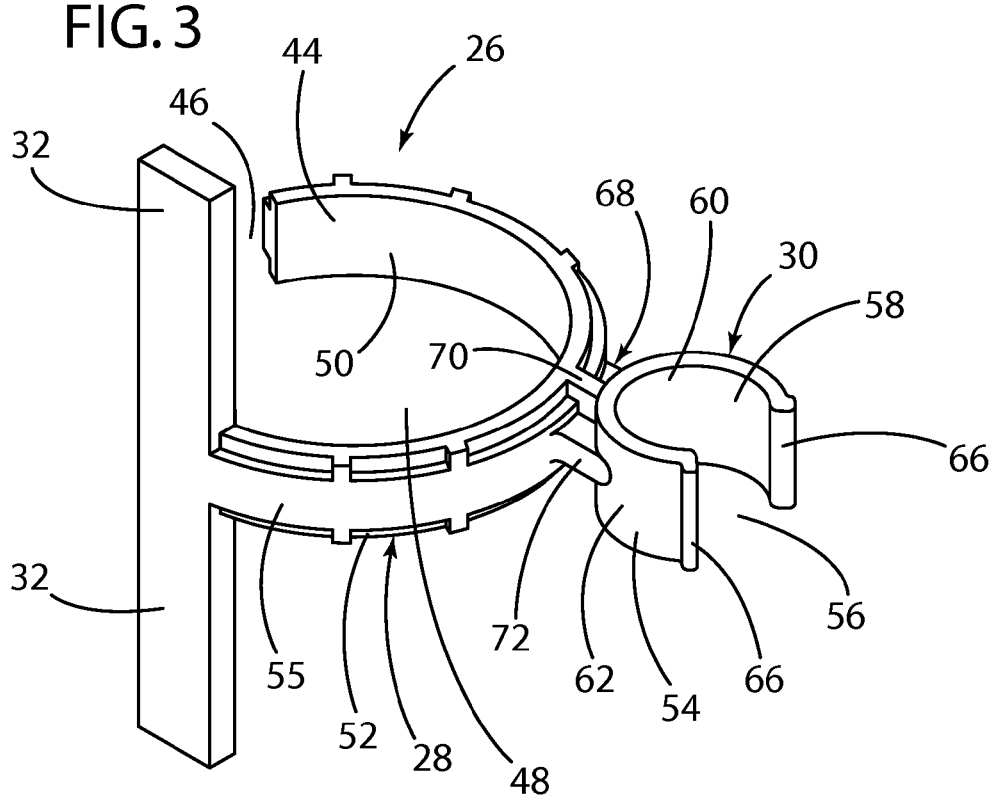
FIG. 3 is a perspective view of the clip embodying the present invention.
Figure 5:
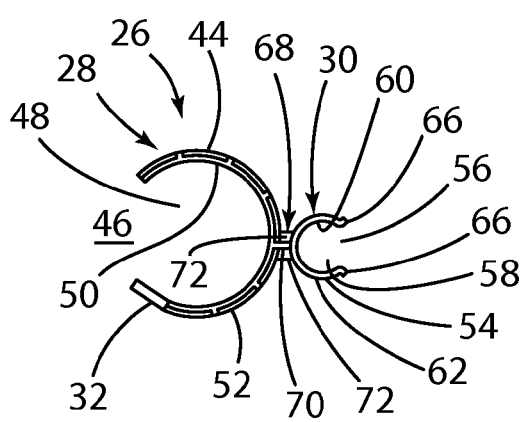
FIG. 5 is a front view of the clip embodying the present invention.
Figure 4:
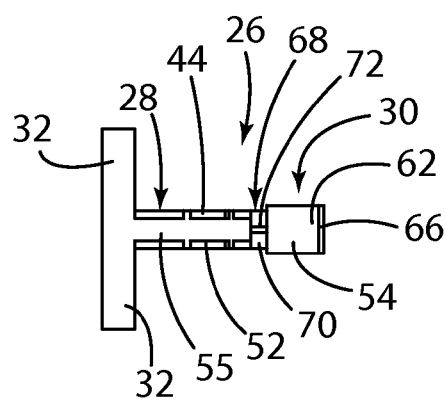
FIG. 4 is a side view of the clip embodying the present invention.

The illustrated wings 32 of the clip 26 assist in preventing the clip 26 from rotating on the side curtain air bag canister 20. As illustrated in FIGS. 3-5, the wings 32 extend from the first section 28 of the clip 26 on one side of the first open slot 46. However, it is contemplated that the wings 32 could extend from the first section 28 of the clip 26 at a position spaced from one side of the first open slot 46. Furthermore, while two wings 32 are shown, it is contemplated that any number of wings 32 could be used (e.g., one wing, two wings, three wings, etc.). Moreover, while the wings 32 are shown as being aligned and extending from a top and bottom of the first section 28 of the clip 26 as shown in FIG. 4, the wings 32 could be spaced from each other such that one wing 32 extends upward from a first location of the first section 28 of the clip 26 in the orientation as shown in FIG. 4 and another wing 32 could extending downward from a second location of the first section 28 of the clip 26 in the orientation as shown in FIG. 4. Additionally, while the wings 32 are shown as extending substantially vertically as shown in the orientation of FIG. 4, it is contemplated that the wings 32 could be swept forward or backward (like a top view of an airplane).

In the illustrated example, the wings 32 of the clip 26 assist in preventing the clip 26 from rotating on the side curtain air bag canister 20. As shown in FIG. 2, the wings 32 overlie the brackets 22 and press downward on the brackets 22. The friction caused by the force of the wings 32 on the brackets 22 and the force of the first section 28 of the clip 26 being forced away from the side curtain air bag canister 20 (as the wings 32 will tend to cause the clip 26 to try to move the side curtain air bag canister 20 into the first open slot 46) will assist in preventing the clip 26 from rotating on the side curtain air bag canister 20. It is contemplated that the wings 32 could have a roughened surface to further assist in preventing the clip 26 from rotating on the side curtain air bag canister 20.

It is to be understood that variations and modifications can be made on the aforementioned structure without departing from the concepts of the present invention, and further it is to be understood that such concepts are intended to be covered by the following claims unless these claims by their language expressly state otherwise.

I claim:
1. A vehicle assembly comprising:
a side curtain air bag canister holding a side curtain air bag;
at least one bracket engaged with the side curtain air bag canister, the at least one bracket being configured to connect the side curtain air bag canister to a frame of the vehicle;
a drain tube being configured to have drain fluid from a moon roof of the vehicle drain therethrough; and
a clip for connecting the drain tube to the side curtain air bag canister, the clip having a first section for engaging the side curtain air bag canister and a second section for engaging the drain tube, the clip having at least one wing abutting the at least one bracket for preventing the clip from rotating on the side curtain air bag canister.

2. The vehicle assembly of claim 1, wherein:
the clip is made of resilient and flexible material.

3. The vehicle assembly of claim 1, wherein:
the first section of the clip comprises a semi-circular canister grasping portion surrounding a portion of the side curtain air bag canister and gripping the side curtain air bag canister.

4. The vehicle assembly of claim 3, wherein:
the second section of the clip comprises a semi-circular drain tube grasping portion surrounding a portion of the drain tube and gripping the drain tube.

5. The vehicle assembly of claim 1, wherein:
the second section of the clip comprises a semi-circular drain tube grasping portion surrounding a portion of the drain tube and gripping the drain tube.

6. The vehicle assembly of claim 1, wherein:
the clip further comprises a spanning section extending between and connecting the first section and the second section.

7. The vehicle assembly of claim 1, wherein:
the at least one bracket comprises at least two brackets;
the brackets surround the side curtain air bag canister; and
the first section of the clip surrounds a portion of the side curtain air bag canister between two of the brackets.

8. The vehicle assembly of claim 7, wherein:
the at least one wing comprises two wings; and
each wing overlies one bracket such that friction between the wings and the bracket prevent the clip from rotating on the side curtain air bag canister.

9. The vehicle assembly of claim 1, wherein:
each at least one wing overlies one bracket such that friction between the at least one wing and the at least one bracket prevents the clip from rotating on the side curtain air bag canister.

10. The vehicle assembly of claim 1, wherein:
the first section of the clip includes a first open slot for accepting the side curtain air bag canister therein; and
the second section of the clip includes a second open slot for accepting the drain tube therein.

11. A vehicle comprising:
a vehicle frame having a moon roof channel, a structural panel and a pillar;
a side curtain air bag canister holding a side curtain air bag;
at least one bracket engaged with the side curtain air bag canister, the at least one bracket connecting the side curtain air bag canister to the structural panel of the vehicle frame of the vehicle;
a drain tube connected to the moon roof channel, the drain tube being configured to route drain fluid from the moon roof channel down the pillar; and
a clip for connecting the drain tube to the side curtain air bag canister, the clip having a first section for engaging the side curtain air bag canister and a second section for engaging the drain tube, the clip having at least one wing abutting the at least one bracket for preventing the clip from rotating on the side curtain air bag canister.

12. The vehicle assembly of claim 11, wherein:
the clip is made of resilient and flexible material.

13. The vehicle assembly of claim 11, wherein:
the first section of the clip comprises a semi-circular canister grasping portion surrounding a portion of the side curtain air bag canister and gripping the side curtain air bag canister.

14. The vehicle assembly of claim 13, wherein:
the second section of the clip comprises a semi-circular drain tube grasping portion surrounding a portion of the drain tube and gripping the drain tube.

15. The vehicle assembly of claim 11, wherein:
the second section of the clip comprises a semi-circular drain tube grasping portion surrounding a portion of the drain tube and gripping the drain tube.

16. The vehicle assembly of claim 11, wherein:
the clip further comprises a spanning section extending between and connecting the first section and the second section.

17. The vehicle assembly of claim 11, wherein:
the at least one bracket comprises at least two brackets;
the brackets surround the side curtain air bag canister; and
the first section of the clip surrounds a portion of the side curtain air bag canister between two of the brackets.

18. The vehicle assembly of claim 17, wherein:
the at least one wing comprises two wings; and
each wing overlies one bracket such that friction between the wings and the bracket prevent the clip from rotating on the side curtain air bag canister.

19. The vehicle assembly of claim 11, wherein:
each at least one wing overlies one bracket such that friction between the at least one wing and the at least one bracket prevents the clip from rotating on the side curtain air bag canister.

20. The vehicle assembly of claim 11, wherein:
the first section of the clip includes a first open slot for accepting the side curtain air bag canister therein; and
the second section of the clip includes a second open slot for accepting the drain tube therein.

21. An assembly comprising:
a canister holding a side curtain airbag and a bracket engaged therewith, the bracket connecting the canister to a frame of a vehicle;
a tube for draining fluid from a moon roof drain; and
a clip connecting the tube to the canister and having a first section engaging the canister and a second section engaging the tube, the clip having a wing abutting the bracket for preventing the clip from rotating on the canister.

* * * * *